(12) United States Patent
Kim et al.

(10) Patent No.: US 8,923,014 B2
(45) Date of Patent: Dec. 30, 2014

(54) DISPLAY DEVICE HAVING TOUCH PANEL

(75) Inventors: Jong-Hyuk Kim, Gumi-si (KR); Joong-Lok Song, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 298 days.

(21) Appl. No.: 13/209,169

(22) Filed: Aug. 12, 2011

(65) Prior Publication Data
US 2012/0044662 A1    Feb. 23, 2012

(30) Foreign Application Priority Data

Aug. 19, 2010  (KR) .......................... 10-2010-0080547
Jul. 27, 2011  (KR) .......................... 10-2011-0074708

(51) Int. Cl.
*H05K 9/00*    (2006.01)
*G06F 3/041*   (2006.01)
*G06F 3/044*   (2006.01)

(52) U.S. Cl.
CPC .... *G06F 3/0418* (2013.01); *G06F 2203/04107* (2013.01); *G06F 3/044* (2013.01)
USPC ............... 361/816; 349/12; 349/59; 349/150; 345/173; 345/174; 345/175

(58) Field of Classification Search
CPC ..................... G06F 3/044; G06F 2203/04107
USPC ............................. 361/816; 349/150, 12, 59; 345/173–175, 204; 178/18.01–18.08
See application file for complete search history.

(56) References Cited

U.S. PATENT DOCUMENTS

| | | | |
|---|---|---|---|
| 7,667,810 B2 * | 2/2010 | Kwon | 349/149 |
| 2008/0062148 A1 * | 3/2008 | Hotelling et al. | 345/174 |
| 2008/0158183 A1 | 7/2008 | Hotelling et al. | |
| 2009/0146945 A1 * | 6/2009 | Cho | 345/104 |
| 2010/0132988 A1 * | 6/2010 | Valentin et al. | 174/257 |
| 2010/0182275 A1 | 7/2010 | Saitou | |
| 2011/0169783 A1 * | 7/2011 | Wang et al. | 345/176 |
| 2011/0187673 A1 * | 8/2011 | Yin et al. | 345/174 |

FOREIGN PATENT DOCUMENTS

| | | | | |
|---|---|---|---|---|
| CN | 1901719 A | | 1/2007 | |
| CN | 101467120 A | | 6/2009 | |
| JP | 2009-086184 | * | 4/2009 | ............ G02F 1/1333 |

OTHER PUBLICATIONS

"Profile Sensor Planning Guide", Jan. 13, 2005, XP055079838, Retrieved from the Internet: URL: http://web.archive.org/web/20050113051458/ http://www.humanthink.co.kr/data/19-257v20.pdf [retrieved on Sep. 18, 2013].

* cited by examiner

*Primary Examiner* — Robert J Hoffberg
*Assistant Examiner* — Mukund G Patel
(74) *Attorney, Agent, or Firm* — Birch, Stewart, Kolasch & Birch, LLP

(57) ABSTRACT

A display device having a touch panel which effectively intercepts noise generated from a display panel to prevent the touch panel from malfunctioning. The display device having the touch panel includes a display panel, a touch panel attached to the display panel through an adhesion layer, a noise interception layer over an entire rear surface of the touch panel to prevent electrical noise from the display panel from being introduced into the touch panel, a metal ring pattern on the noise interception layer to surround the edge of the noise interception layer and having lower electrical resistance than the noise interception layer, and a ground terminal electrically connected to the noise interception layer and the metal ring pattern.

10 Claims, 6 Drawing Sheets

DISPLAY DEVICE HAVING TOUCH PANEL

This application claims the priority benefits of Korean Patent Application No. 10-2010-0080547, filed on Aug. 19, 2010 in Republic of Korea, and Korean Patent Application No. 10-2011-0074708, filed on Jul. 27, 2011 in Republic of Korea, which are hereby incorporated by references as if fully set forth herein.

BACKGROUND OF THE INVENTION

1. Field of the Invention

The present invention relates to a display device having a touch panel, and more particularly, to a display device having a touch panel which effectively intercepts noise generated from a display panel to prevent the touch panel from malfunctioning.

2. Discussion of the Related Art

Recently, a touch screen enabling information input through touch on screens of various display devices has been widely used as an information input unit of a computer system. The touch screen moves or selects display information simply by user touch using his/her fingers or a stylus, thus being easily used by anyone regardless of age or sex.

The touch screen senses touch generated on a screen of a display device or a touch position and outputs touch information, and the computer system analyzes the touch information and then performs a command. As the display device, a flat display device, such as a liquid crystal display device, a plasma display panel or an organic light emitting diode display device, is generally used.

Touch screen technology is divided into a resistive type, a capacitive type, an infrared type, an ultrasonic type or an electromagnetic type according to sensing methods. Among these types, the resistive type and the capacitive type are advantageous in terms of manufacturing costs, thus being widely used.

A resistive type touch screen recognizes touch by sensing change of voltage generated by contact between upper and lower resistance films (transparent conductive films) due to touch pressure. However, the resistive type touch screen is disadvantageous in that the touch screen or a display device is easily damaged due to touch pressure and the touch screen has low light transmittance due to scattering in an air layer between the resistance films.

A capacitive type touch screen to overcome the drawbacks of the resistive type touch screen recognizes touch by sensing change of capacitance generated by movement of a small amount of charges to a touch point when a conductor, such as a human body or a stylus, touches the touch screen. The capacitive type touch screen has high durability due to use of tempered glass, has high light transmittance and excellent touch sensing capacity, and enables multi-touch, thus attracting wide attention.

In general, a touch screen is manufactured as a panel that is attached to the upper portion of a display device, thus enabling touch input. However, the display device having the touch panel is disadvantageous in that a touch sensor in the touch panel may malfunction due to ElectroMagnetic Interference (EMI) caused by noise generated from the display device, i.e., static electricity.

SUMMARY OF THE INVENTION

Accordingly, the present invention is directed to a display device having a touch panel.

An object of the present invention is to provide a display device having a touch panel which effectively intercepts noise generated from a display panel to prevent the touch panel from malfunctioning.

To achieve this object and other advantages and in accordance with the purpose of the invention, as embodied and broadly described herein, a display device having a touch panel includes a display panel, a touch panel attached to the display panel through an adhesion layer, a noise interception layer over an entire rear surface of the touch panel to prevent electrical noise from the display panel from being introduced into the touch panel, a metal ring pattern on the noise interception layer to surround the edge of the noise interception layer and having lower electrical resistance than the noise interception layer, and a ground terminal electrically connected to the noise interception layer and the metal ring pattern.

The touch panel may include a lower substrate, the outer surface of which is provided with the noise interception layer, the metal ring pattern and the ground terminal, a capacitive type touch sensor formed on the inner surface of the lower substrate, and a cover substrate formed on the touch sensor.

The display device may further include a circuit film to electrically connect the touch sensor to a touch controller to drive the touch sensor, and a circuit film extension bent from the inner surface of the lower substrate along the side surface of the lower substrate and connected to the ground terminal formed on the rear surface of the lower substrate.

The circuit film extension may be configured such that a width of a first part thereof connected to the ground terminal is greater than a width of a second part thereof bent along the side surface of the lower substrate.

The metal ring pattern and the ground terminal are integrally formed in the same metal layer.

The display device may further include at least one metal line formed on the noise interception layer and electrically connected to the metal ring pattern.

If the display device is a liquid crystal display device, the at least one metal line may be aligned with a black matrix layer of the liquid crystal display device in the gate line direction of the liquid crystal display device.

The at least one metal line has a line width of 1 μm to 3 μm.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, with reference to the accompanying drawings, a display device having a touch panel in accordance with embodiments of the present invention will be described in detail.

First Embodiment

Figure 1:
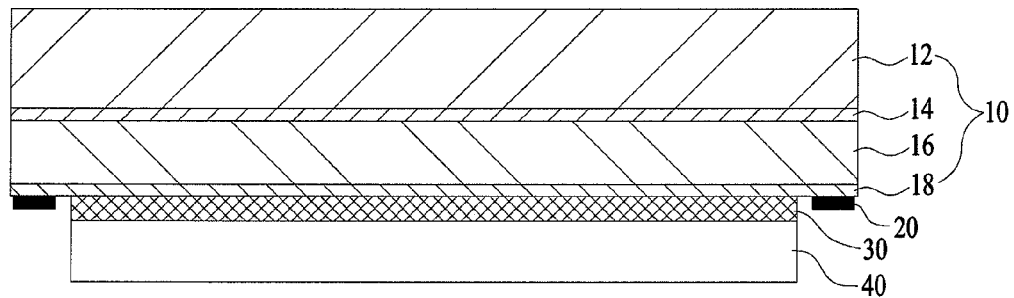
FIG. 1 is a schematic longitudinal-sectional view of a display device having a touch panel in accordance with a first embodiment of the present invention.

FIG. 1 is a schematic longitudinal-sectional view of a display device having a touch panel in accordance with a first embodiment of the present invention.

The display device shown in FIG. 1 includes a display panel 40 and a touch panel 10 attached to the surface of the display panel 40 by an adhesion layer 30.

As the display panel 40, a flat display device, such as a liquid crystal display device, a plasma display panel or an organic light emitting diode display device, is generally used. For example, if a liquid crystal display device is used as the display panel 40, the liquid crystal display device includes a color filter substrate on which a color filter array is formed, a thin film transistor substrate on which a thin film transistor array is formed, a liquid crystal layer formed between the color filter substrate and the thin film transistor substrate, and polarizing plates respectively attached to the outer surfaces of the color filter substrate and the thin film transistor substrate. The liquid crystal display device drives the liquid crystal layer using a horizontal electric field or a vertical electric field according to an image signal, thus displaying an image.

The transparent adhesion layer 30 is applied to the entire surface of the display panel 40, and the touch panel 10 is attached to the display panel 40 through the adhesion layer 30. The adhesion layer 30 is formed of an optical elastic resin, for example, Super View Resin (SVR), which is an acryl-based UV curable resin, may be used. The SVR has improved visibility and impact resistance.

The touch panel 10 includes a touch sensor 14 formed on a lower substrate 16, and a cover substrate 12 located on the upper surface of the touch sensor 14. The lower substrate 16 and the cover substrate 12 are formed of glass or a transparent polymer. Further, the cover substrate 12 may be formed of tempered glass having high durability. The touch panel 10 uses the capacitive type touch sensor 14 which recognizes touch by sensing change of capacitance generated by movement of a small amount of charges to a touch point when a conductor, such as a human body or a stylus, touches the touch panel 10. The touch sensor 14 is electrically connected to a touch controller mounted on a circuit film, such as a Flexible Print Circuit (FPC), through the circuit film. The touch controller supplies a drive signal to the touch sensor 14 and receives a sensing signal from the touch sensor 14, thus judging whether or not touch is present and a touch position.

Figure 2A:
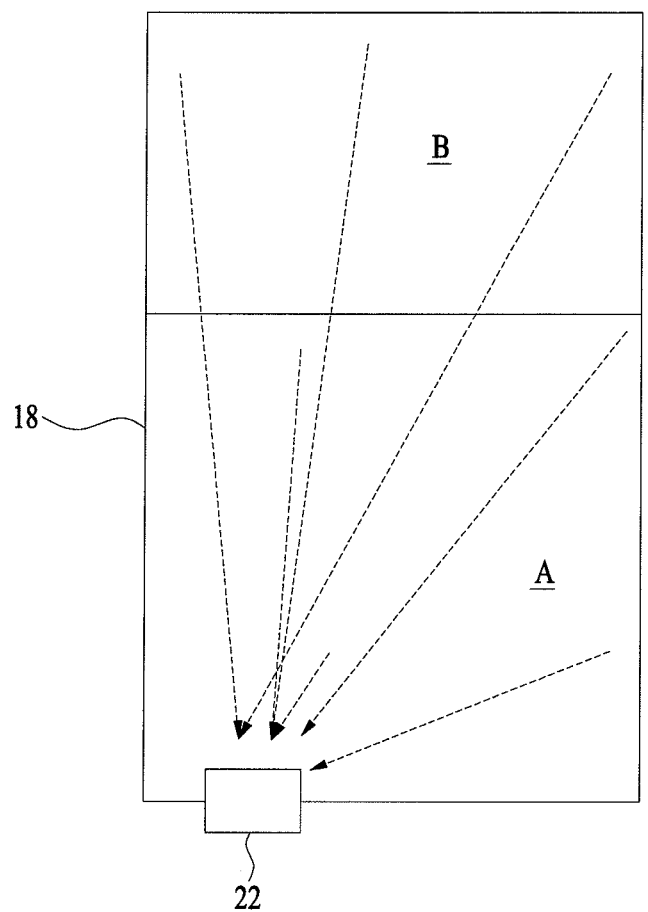
FIGS. 2A and 2B are views illustrating discharge paths of noise according to presence or absence of a metal ring pattern in accordance with the first embodiment of the present invention.
Figure 2B:
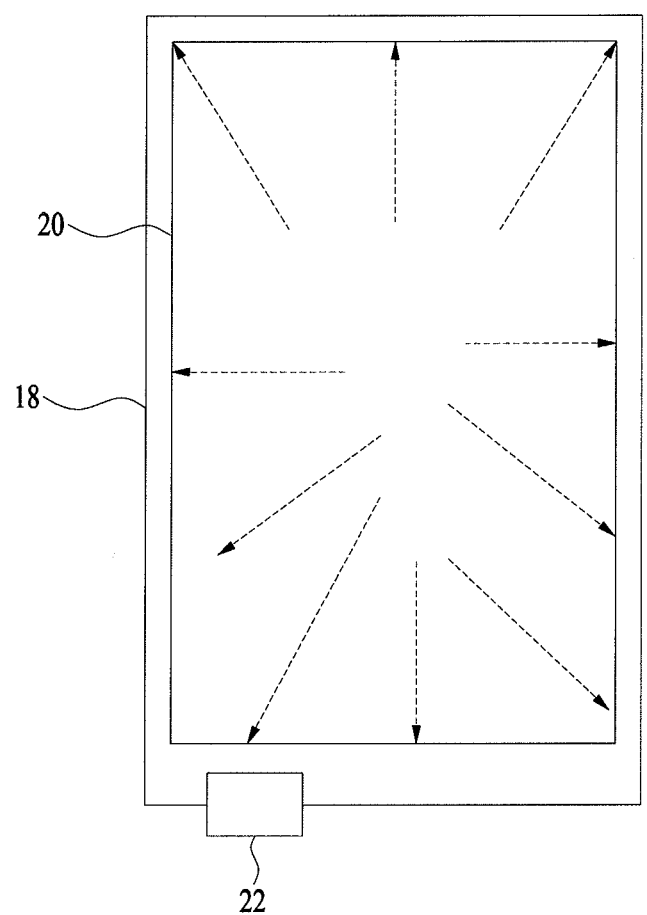

A noise interception layer 18 to prevent noise radiated from the display panel 40 from being introduced into the touch panel 10 is formed between the touch panel 10 and the display panel 40, i.e., over the entire rear surface of the touch panel 10. The noise interception layer 18 is formed by depositing a transparent conductive layer on the rear surface of the touch panel 10, i.e., the outer surface of the lower substrate 16, using a deposition method, such as sputtering or Chemical Vapor Deposition (CVD). The transparent conductive layer is formed of a transparent conductive material, such as Indium Tin Oxide (ITO), Indium Zinc Oxide (IZO), Indium Tin Zinc Oxide (ITZO) or Antimony Tin Oxide (ATO). The noise interception layer 18 is electrically connected to a ground terminal 22, as shown in FIGS. 2A and 2B. The ground terminal 22 is connected to a ground power source through the FPC. Therefore, the noise interception layer 18 discharges noise, radiated from the display panel 40 and then introduced into the noise interception layer 18, i.e., static electricity, to the ground terminal 22, thereby preventing noise radiated from the display panel 40 from being introduced into the touch panel 10. The noise interception layer 18 is formed over the entire rear surface of the lower substrate 16, and thus may intercept all electrical noise introduced from a display area and a peripheral drive circuit area of the display panel 40 into a touch sensing area and an outer area of the touch panel 10.

Particularly, as shown in FIG. 2B, a metal ring pattern 20 having lower electrical resistance than the noise interception layer 18 to shorten discharge delay time of noise is formed at the edge of the noise interception layer 18. The metal ring pattern 20 together with the noise interception layer 18 are electrically connected to the ground terminal 22, thus serving to rapidly discharge noise, discharged from the noise interception layer 18, to the ground terminal 22. The metal ring pattern 20 is formed at the edge of the noise interception layer 18 through sputtering or printing. The metal ring pattern 20 is formed of a metal having relatively low electrical resistance, such as molybdenum (Mo), copper (Cu), silver (Ag), chromium (Cr), aluminum (Al), aluminum neodymium (AlNd) and molybdenum titanium (MoTi). Further, the metal ring pattern 20 is formed in the same metal layer as the ground terminal 22 formed under the noise interception layer 18 and is electrically connected to the ground terminal 22. For example, the metal ring pattern 20 is formed in a closed rectangular strip shape at the edge of the noise interception layer 18 through printing using an Ag paste. Further, the ground terminal 22 is electrically connected to the metal ring pattern 20 and is formed under the noise interception layer 18 through printing using the same Ag paste as the metal ring pattern 20.

The transparent conductive layer used as the noise interception layer 18 has relatively high electrical resistance. Thereby, if the metal ring pattern 20 is not present, as shown in FIG. 2A, a region of the noise interception layer 18 close to the ground terminal 22, i.e., a lower portion A, rapidly discharges noise, but in a region of the noise interception layer 18 distant from the ground terminal 22, i.e., an upper portion B, time taken to discharge noise through the ground terminal 22 is delayed due to high electrical resistance and thus the noise may be introduced into the touch panel 10. In this case, some regions of the touch panel 10, i.e., the upper portion B recognizes the noise as a normal sensing signal or does not sense touch due to the noise, and thus the touch panel 10 may malfunction.

On the other hand, if the metal ring pattern 20 having lower electrical resistance than the transparent conductive layer is additionally formed at the edge of the noise interception layer 18, as shown in FIG. 2B, even the region of the noise interception layer 18 distant from the ground terminal 22, i.e., the upper portion, rapidly discharges noise through the metal ring pattern 20. That is, the noise interception layer 18 rapidly discharges noise toward the ground terminal 22 through the metal ring pattern 20 regardless of the distance with the ground terminal 22. Thereby, introduction of the noise from the display panel 40 into some regions of the touch panel 10 due to noise discharge delay of the noise interception layer 18 may be effectively prevented. As a result, malfunction of the touch panel 10 due to introduction of noise from the display panel 40 into the touch panel 10 may be prevented.

Figure 3:
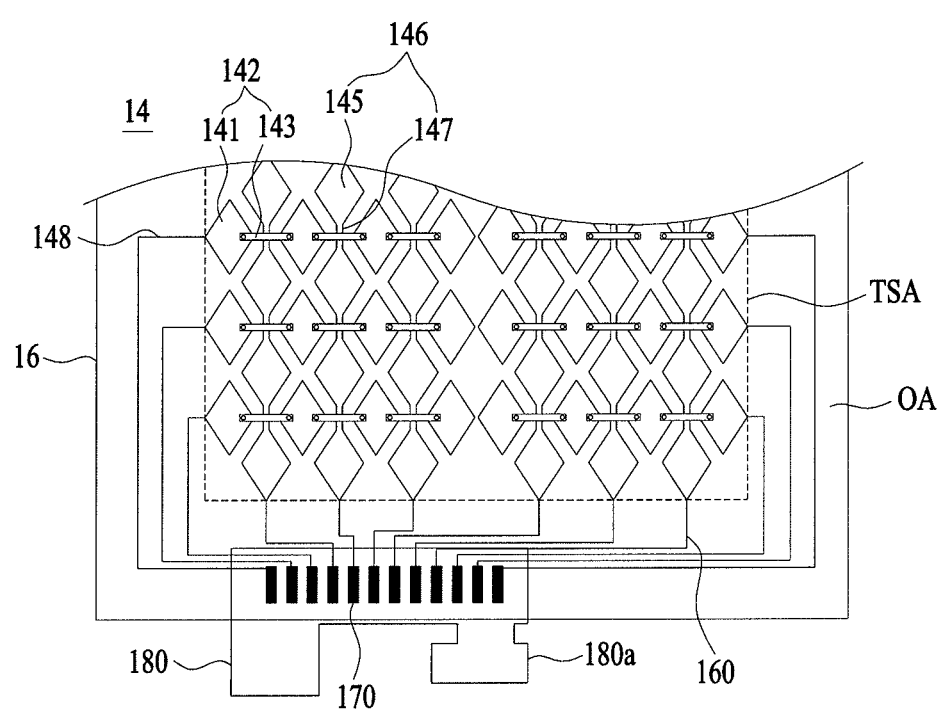
FIG. 3 is a plan view of an electrode structure in a part of a capacitive type touch sensor shown in FIG. 1.

FIG. 3 is a plan view exemplarily illustrating an electrode structure in a part of the capacitive type touch sensor 14 shown in FIG. 1.

The capacitive type touch sensor 14 shown in FIG. 3 includes a plurality of first sensing electrode lines 142 in which a plurality of first sensing electrodes 141 are connected in the horizontal direction (i.e., in the X-axis direction) by first connection electrodes 143, and a plurality of second sensing electrode lines 146 in which a plurality of second sensing electrodes 145 are connected in the vertical direction (i.e., in the Y-axis direction) by second connection electrodes 147, in a touch sensing area TSA. The plurality of first sensing electrode lines 142 are arranged in the vertical direction (in the Y-axis direction), and the plurality of second sensing electrode lines 146 are arranged in the horizontal direction (in the X-axis direction). The first and second sensing electrodes 141 and 145 are formed in a diamond shape, but may be formed in various other shapes. The first and second connection electrodes 143 and 147 cross each other under the condition that an insulating layer (not shown) is interposed between the first and second connection electrodes 143 and 147. The first and second sensing electrodes 141 and 145 and the second connection electrodes 147 are formed of the same transparent conductive layer, and the first connection electrodes 143 are formed of a metal layer formed such that the insulating layer is interposed between the transparent conductive layer and the metal layer. The first connection electrodes 143 are electrically connected to the first sensing electrodes 141 through contact holes passing through the insulating layer. Alternatively, the first and second sensing electrodes 141 and 145 and the first connection electrode 143 may be formed of the same transparent conductive layer and the second connection electrodes 147 may be formed of a metal layer formed such that the second connection electrodes 147 are electrically connected to the second sensing electrodes 145 through contact holes. The first and second sensing electrodes 141 and 145 form a capacitor together with a conductive touch object to touch the cover substrate 12 and change capacitance, thus outputting a sensing signal.

Further, the capacitance type touch sensor 14 further includes a plurality of first routing lines 148 electrically connected respectively to the first sensing electrode lines 142 located in the touch sensing area TSA, a plurality of second routing lines 160 electrically connected respectively to the second sensing electrode lines 146 located in the touch sensing area TSA, and pads 170 electrically connected respectively to the first and second routing lines 148 and 160, in an outer area OA surrounding the touch sensing area TSA. The first routing lines 148 are respectively connected to left and right ends of the first sensing electrode lines 142 and are connected to the corresponding pads 170 located in a pad area at the lower portion of the outer area OA. The second routing lines 160 are respectively connected to the lower ends of the second sensing electrode lines 146 and are connected to the corresponding pads 170 located in the pad area. The first and second routing lines 148 and 160 and the pads 170 are formed in the same metal layer as one of the first and second connection electrodes 143 and 147 in the touch sensing area TSA.

For example, after a metal pattern including the first and second routing lines 148 and 160 and the pads 170 in the outer area OA and one of the first and second connection electrodes 143 and 147 in the touch sensing area TSA is formed on the lower substrate 16, the insulating layer provided with the contact holes is formed on the metal pattern, and a transparent conductive pattern including the first and second sensing electrodes 141 and 145 and the other one of the first and second connection electrodes 143 and 147 is formed on the insulating layer.

The plural pads 170 formed in the pad area are electrically connected to an FPC 180, and thus are electrically connected to a touch controller (not shown) mounted on the FPC 180. The touch controller not only drives the first and second sensing electrode lines 142 and 146 of the touch sensor 14 but also senses whether or not touch is present by receiving sensing signals output from the first and second sensing electrode lines 142 and 146 and integrating the sensing signals per unit time and senses a touch position from X-axis and Y-axis positions of the first and second sensing electrode lines 142 and 146 outputting the sensing signals.

Figure 4:
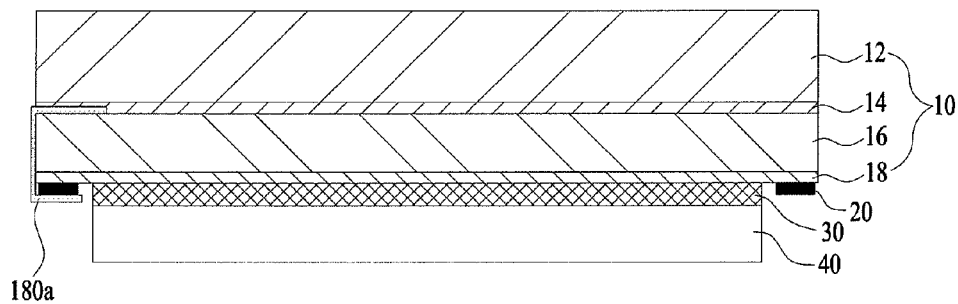
FIG. 4 is a longitudinal-sectional view illustrating a connection structure between an FPC and a ground terminal located on the rear surface of the touch panel shown in FIG. 3.

An extension 180A extended from one side end of the FPC 180 is electrically connected to the ground terminal 22 formed on the rear surface of the touch panel 10, as shown in FIG. 2B. That is, the extension 180A of the FPC 180 is bent along the side surface of the lower substrate 16 of the touch panel 10, as shown in FIG. 4, and is electrically connected to the ground terminal 22 formed on the rear surface of the lower substrate 16. The extension 180A of the FPC 180 includes a part having a small width bent along the side surface of the lower substrate 16, and a part having a large width connected to the ground terminal 22. The FPC 180 discharges noise, discharged from the noise interception layer 18 through the metal ring pattern 20 and the ground terminal 22, toward the ground power source, thus removing the noise.

As described above, in the display device having the touch panel in accordance with the first embodiment of the present invention, the noise interception layer 18 formed of a transparent conductive layer is formed over the entire rear surface of the touch panel 10 attached to the display panel 40 and the metal ring pattern 20 is formed at the edge of the noise interception layer 18, thus effectively intercepting noise introduced from the display panel 40 regardless of the distance between the noise interception layer 18 and the ground terminal 22. Thereby, noise introduced into the touch panel 10 from the display panel 40 is minimized and thus malfunction of the touch panel 10 due to noise is prevented, and noise introduced into the touch controller through the touch sensor 10 is minimized and thus a sensing signal drive range is expanded, thus improving sensing performance of the touch controller.

Second Embodiment

Even if the metal ring pattern 20 having lower electrical resistance than the transparent conductive layer is formed at the edge of the noise interception layer 18, the central portion of the noise interception layer 18 may have a higher electrical resistance value than the portion of the noise interception layer 18 where the metal ring pattern 20 is formed.

In order to solve such a problem, the relatively higher electrical resistance value of the central portion of the noise interception layer 18, a metal line cannot be randomly formed at the central portion of the noise interception layer 18. The reason is that the metal line formed at the central portion of the noise interception layer 18 blocks a screen displayed on the display device.

From among display devices, a liquid crystal display device includes a thin film transistor array substrate, a color filter array substrate and a liquid crystal layer filling a gap between the two substrates.

The thin film transistor array substrate includes a plurality of gate lines and a plurality of data lines arranged in directions perpendicular to each other to form pixel regions, a plurality of thin film transistors formed at the pixel regions where the gate lines and the data lines intersect each other, and a plurality of pixel electrodes formed at the respective pixel regions. The thin film transistors are turned on/off according to scan signals of the gate lines and supply data signals of the data lines to the respective pixel electrodes.

The color filter array substrate includes a black matrix layer formed at regions corresponding to the plurality of gate lines, the plurality of data lines and the plurality of the thin film transistors formed on the thin film transistor array substrate so as to prevent light leakage, and color filter layers formed at regions corresponding to the respective pixel regions so as to implement colors.

Therefore, in addition to the first embodiment of the present invention, in order to prevent the relatively higher electrical resistance value of the central portion of the noise interception layer 18, a metal line aligned with the black matrix layer may be formed at the central portion of the noise interception layer 18.

A display device having a touch panel in which metal lines are formed at the metal ring pattern 20 formed at the central portion of the noise interception layer 18 in accordance with a second embodiment of the present invention will be described, as follows.

Figure 5:
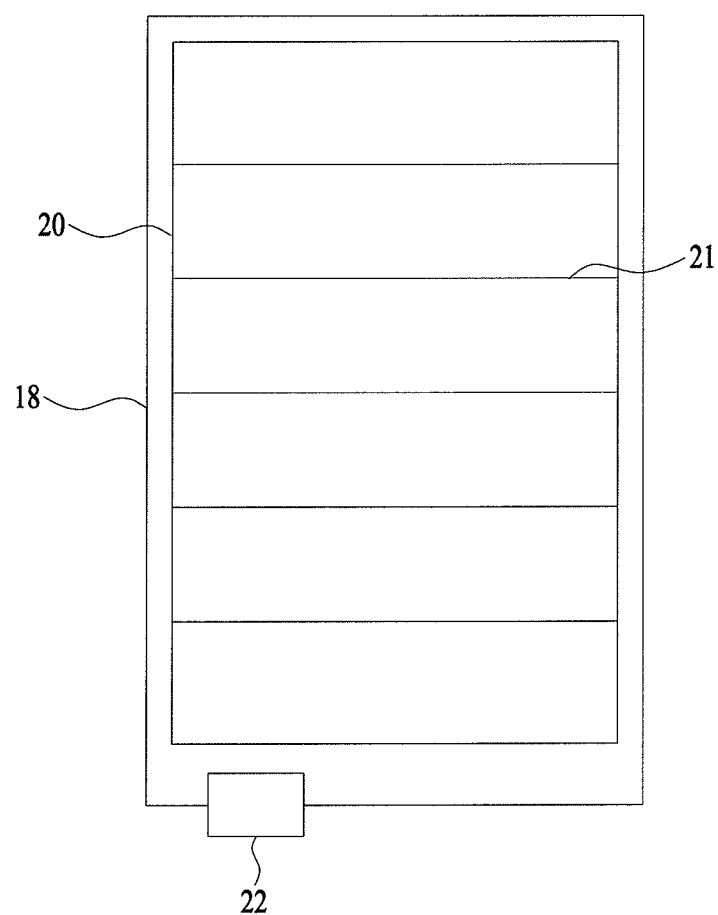
FIG. 5 is a rear view of a touch panel illustrating a metal ring pattern and metal lines formed on a noise interception layer in accordance with a second embodiment of the present invention.

FIG. 5 is a rear view of a touch panel illustrating a metal ring pattern and metal lines formed on a noise interception layer in accordance with the second embodiment of the present invention.

The display device having the touch panel in accordance with the second embodiment of the present invention has the identical configuration of the display device in accordance with the first embodiment of the present invention shown in FIGS. 1 to 4 except that at least one metal line 21 is formed on the noise interception layer 18 formed on the rear surface of the touch panel in addition to the metal ring pattern 20 to prevent the relatively higher electrical resistance value of the central portion of the noise interception layer 18.

Therefore, some parts in this embodiment which are substantially the same as those in the first embodiment are denoted by the same reference numerals even though they are depicted in different drawings, and a detailed description thereof will be thus omitted because it is considered to be unnecessary.

If the display device is a liquid crystal display device, the at least one metal line 21 is aligned with the black matrix layer of the liquid crystal display device.

The black matrix layer (not shown) is formed at regions corresponding to the plurality of gate lines, the plurality of data lines and the plurality of thin film transistors formed on the thin film transistor array substrate so as to prevent light leakage. The black matrix layer formed along the gate lines has a width of about 7 μm greater than the width of the black matrix layer formed along the data lines.

Therefore, the at least one metal line 21 electrically connected to the metal ring pattern 20 is preferably formed at a display region on the noise interception layer 18 such that the at least one metal line 21 is aligned with the black matrix layer in the gate line direction.

That is, since the black matrix layer formed along the gate lines has a width of about 7 μm, even if it is assumed that an alignment process margin (error) is about 3 μm, a designable width of the at least one metal line 21 is about 3 μm at the most. That is, a line width of the at least one metal line 21 is preferably set to 1 μm to 3 μm.

As described above, in order to prevent the relatively higher electrical resistance value of the central portion of the noise interception layer 18, the at least one metal line 21 is added.

Here, since the at least one metal line 21 is formed of the same material as the metal ring pattern 20, any additional mask process is not required.

Therefore, in accordance with the second embodiment of the present invention, the at least one metal line 21 is aligned with the black matrix layer formed in the gate line direction of the display device 40 and is formed on the noise interception layer 18, thus being capable of preventing the higher electrical resistance value of the central portion of the noise interception layer 18 than the portion of the noise interception layer 18 where the metal ring pattern 20 is formed without affecting a screen displayed by the display device 40.

That is, since the at least one metal line 21 aligned with the black matrix layer in the gate line direction of the display device 40 is formed, resistance of the touch panel may be reduced and uniformity of the touch panel may be improved without adversely affecting visibility of the display device 40.

As is apparent from the above description, in the display device having the touch panel in accordance with the present invention, the metal ring pattern having low electrical resistance is formed at the edge of the noise interception layer formed of the transparent conductive layer between the touch panel and the display panel, thus rapidly discharging noise from the display panel through the ground terminal regardless of the distance between the noise interception layer and the ground terminal.

Therefore, the noise from the display panel is effectively intercepted and thus malfunction of the touch sensor is prevented, and noise introduced into the touch controller is reduced and thus a sensing signal drive range is expanded, thus improving sensing signal recognition rate.

Further, at least one metal line aligned with a black matrix layer formed in the gate line direction of the display device is formed on the noise interception layer, thus reducing resistance of the touch panel and improving uniformity of the touch panel without adversely affecting visibility of the display device.

It will be apparent to those skilled in the art that various modified embodiments and variations can be made in the present invention without departing from the spirit or scope of the inventions. Thus, it is intended that the present invention covers the modified embodiments and variations of this invention provided they come within the scope of the appended claims and their equivalents.

What is claimed is:

1. A display device, comprising:
    a display panel including a color filter substrate, a thin film transistor substrate and a liquid crystal layer formed between the color filter substrate and the thin film transistor substrate;
    a touch panel including a lower substrate, a cover substrate and a touch sensor between the lower substrate and the cover substrate, the lower substrate attached to the color filter substrate through an adhesion layer;
    a noise interception layer over an entire rear surface of the lower substrate to prevent electrical noise from the display panel from being introduced into the touch panel;
    a metal ring pattern on the noise interception layer to surround the edge of the noise interception layer and having lower electrical resistance than the noise interception layer, the metal ring pattern being not in contact with the adhesive layer and disposed outside an area of the adhesive layer and the display panel;

a ground terminal electrically connected to the noise interception layer and the metal ring pattern;

a circuit film to electrically connect the touch sensor to a touch controller to drive the touch sensor; and a circuit film extension bent from an inner surface of the lower substrate along a side surface of the lower substrate and connected to the ground terminal formed on an outer surface of the lower substrate.

2. The display device according to claim 1, wherein the circuit film extension is configured such that a width of a first part thereof connected to the ground terminal is greater than a width of a second part thereof bent along the side surface of the lower substrate.

3. The display device according to claim 1, wherein the metal ring pattern and the ground terminal are integrally formed in the same metal layer.

4. The display device according to claim 1, wherein the noise interception layer is formed of a transparent conductive layer.

5. The display device according to claim 1, further comprising at least one metal line formed on the noise interception layer and electrically connected to the metal ring pattern.

6. The display device according to claim 5, wherein:

the display device is a liquid crystal display device including a plurality of gate lines and a plurality of data lines respectively arranged in directions perpendicularly to each other to form pixel regions, a plurality of thin film transistors formed at the pixel regions where the respective gate lines and the respective data lines intersect each other, and a black matrix layer formed at regions corresponding to the plurality of gate lines, the plurality of data lines and the plurality of thin film transistors to prevent light leakage; and the at least one metal line is aligned with the black matrix layer.

7. The display device according to claim 6, wherein the at least one metal line is aligned with the black matrix layer in the gate line direction.

8. The display device according to claim 7, wherein the at least one metal line has a line width of 1 µm to 3 µm.

9. The display device according to claim 1, wherein the noise interception layer is directly connected to the rear surface of the lower substrate.

10. The display device according to claim 7, wherein the at least one metal line overlaps the black matrix layer relative to a viewpoint from the touch panel.

* * * * *